Jan. 19, 1954
T. NERMAN
2,666,610
TRIPOD HEAD
Filed Feb. 15, 1950
4 Sheets-Sheet 1
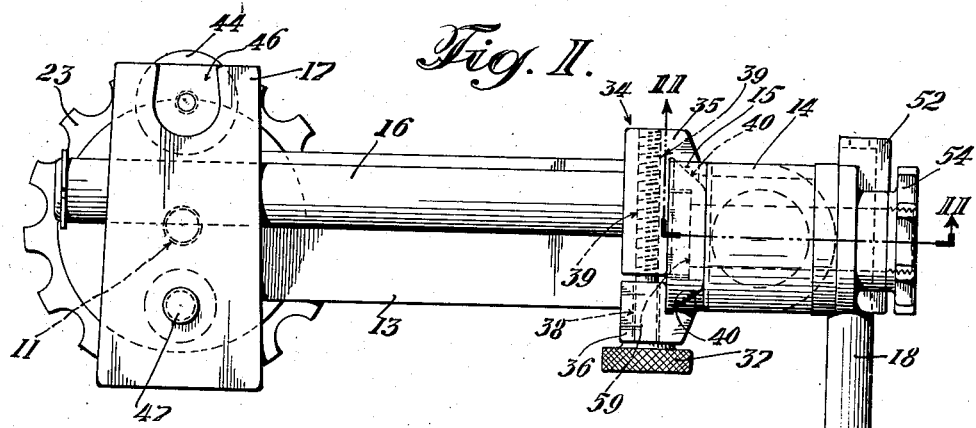
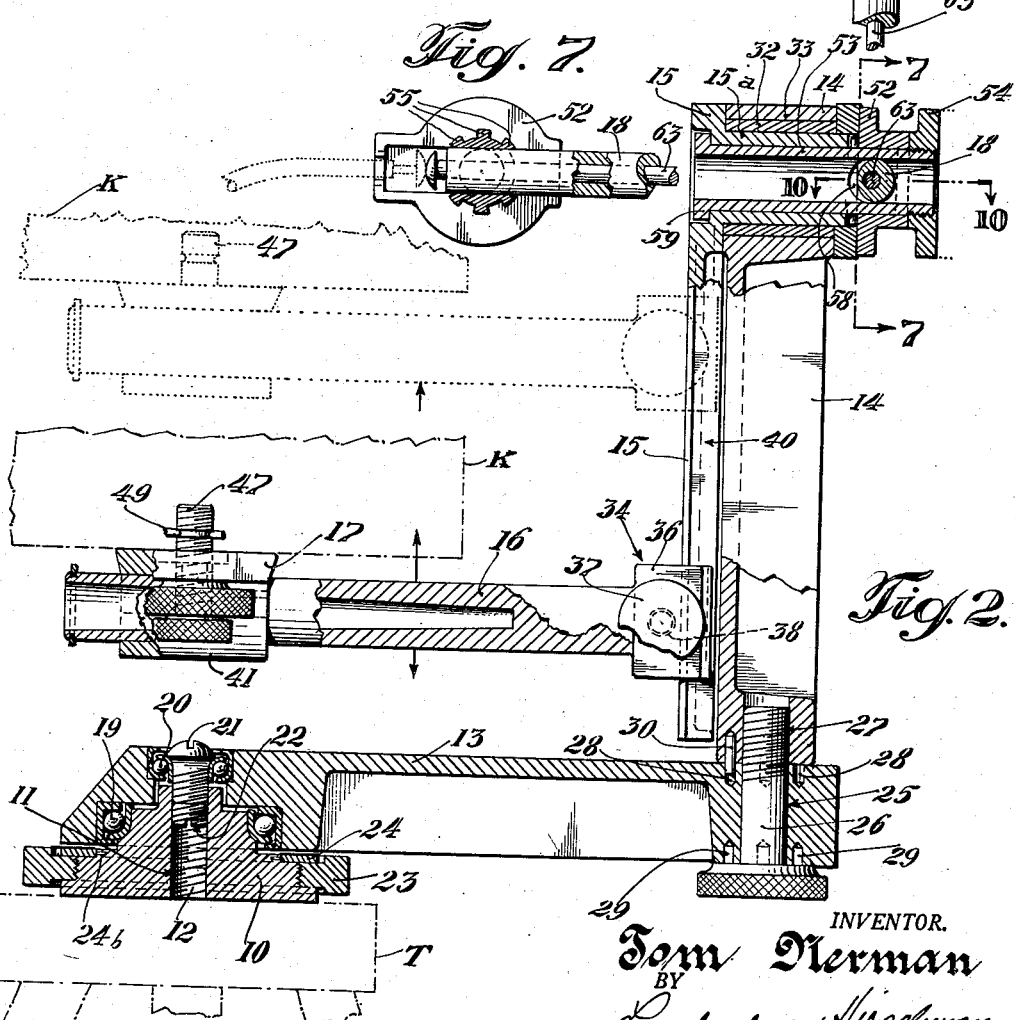
INVENTOR.
Tom Nerman
BY
Lachenbach & Hirschman
Attorneys

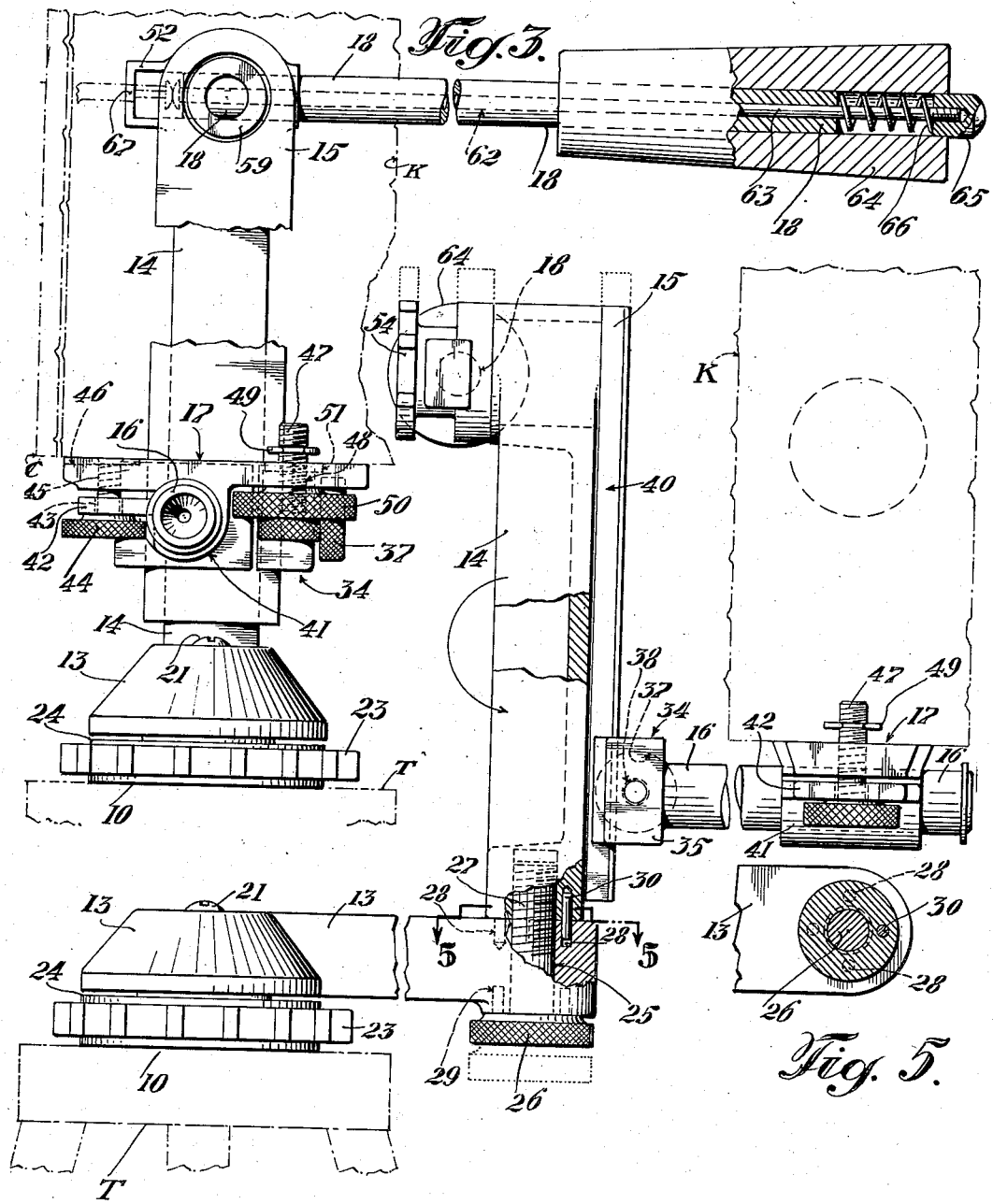

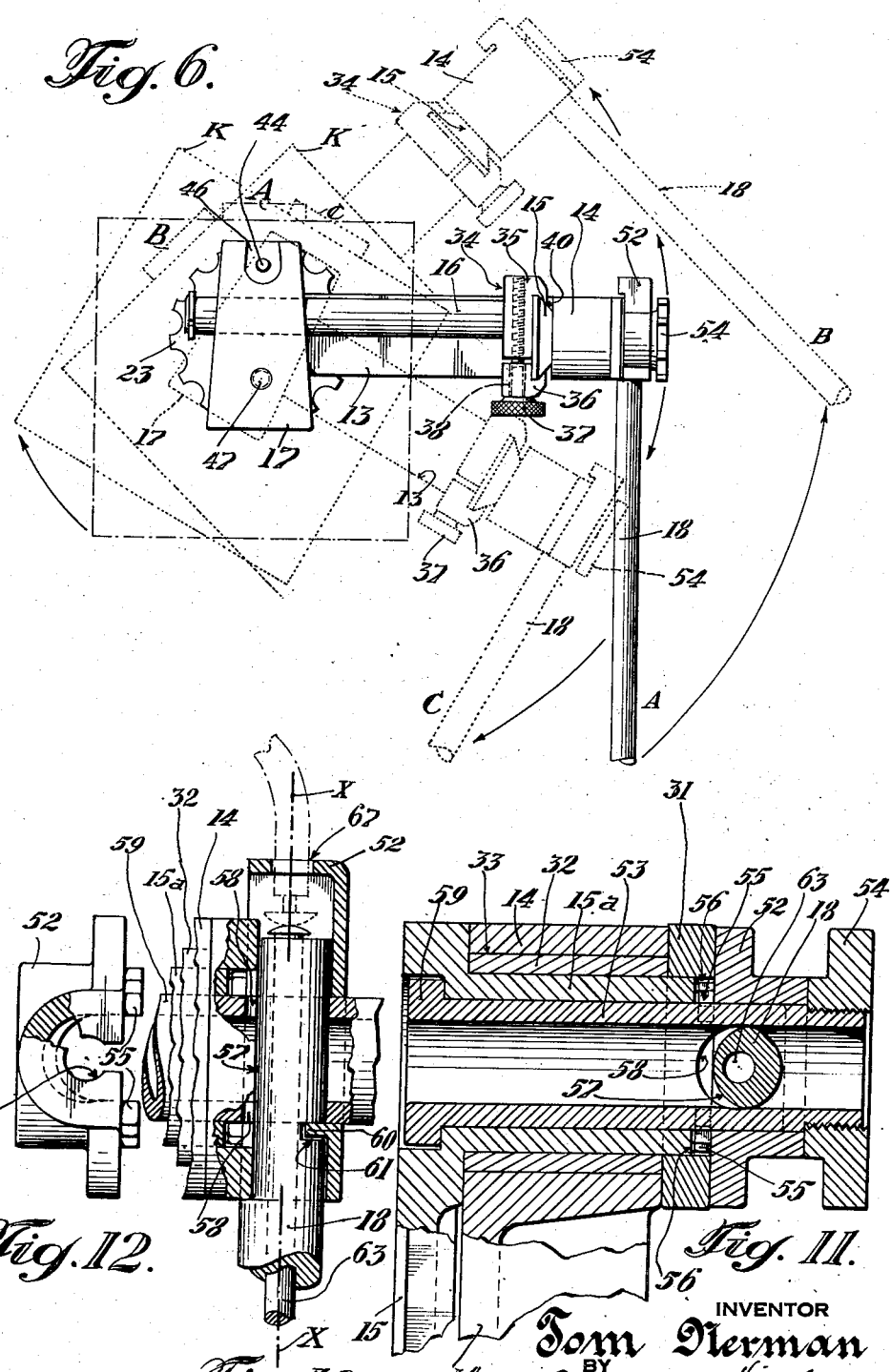

Jan. 19, 1954 T. NERMAN 2,666,610
TRIPOD HEAD
Filed Feb. 15, 1950 4 Sheets-Sheet 4

INVENTOR
Tom Nerman
BY
Rachenbach & Hirschman
ATTORNEYS

Patented Jan. 19, 1954

2,666,610

UNITED STATES PATENT OFFICE 2,666,610

TRIPOD HEAD

Tom Nerman, New York, N. Y.

Application February 15, 1950, Serial No. 144,295

12 Claims. (Cl. 248—183)

1

The present invention relates to a panoramic head for a camera tripod.

The general object of the invention is to provide a head for a camera tripod that will permit the mounting of the camera on a tripod in a position where it is perfectly balanced so that the weight of the camera will exert no substantial torque about any of the axes of rotation, or will permit the mounting of the camera on the head in the horizontal or vertical plane, and will not change the distance between the lens and the subject being photographed, and which will also provide mounting means that will permit universal and free rotation of the camera in any direction.

The head of the type here considered is used for movie cameras which may be extremely heavy, especially when loaded with large amounts of film. Since it is extremely important for the operator to be able to move the camera rapidly and smoothly, some means of providing complete balance for the camera is necessary. It has been common practice, heretofore, to use springs or counterweights to balance the camera. It is the object of this invention to eliminate the necessity of using such springs and counterweights by providing a head onto which any camera may be mounted with its center of gravity located at the intersection of the axes of rotation in horizontal and vertical planes so that the camera will always be in complete balance no matter into what position it is later swung while shooting, and thus will exert no substantial torque about these axes that would have to be overcome by the operator to aim the camera. This feature is especially important in the movement of the camera about the horizontal axis of rotation.

This same flexibility in mounting the camera on the head also permits as an alternative and optionally, the mounting of the camera with the center of its lens located at the point of intersection of the axes for rotation in the horizontal and vertical planes. Thus, where the distance between the camera lens and subject is critical for the focus of the camera, such as where a subject is very close to the camera, this last mentioned feature is very important, since movement of the camera about an axis of rotation of the head would, alter the distance between the subject and the lens unless the camera were so mounted.

It is also an object of the present invention to provide a head that will give great flexibility in mounting of the camera. So that shots may be taken panning the camera around the corner of a building, with the camera upside down or with the camera mounted under the tripod so as to locate the camera close to the ground.

Another object of the present invention is to provide a head that has great flexibility in movement allowing extremely free and maximum movement of the camera in all directions, thus allowing the operator to readily follow a subject up and down in the vertical plane or to the right or left in the horizontal plane.

It is still another object of the present invention to provide an operating arm that can be adjusted in angular relation to the camera to suit the convenience of the operator, and to provide a means for operating the shutter on the camera, by using a release on the extreme end of the operating arm so that the operator can position the camera and operate it with one hand. The free movement of the operating arm in angular relation to the camera also permits the mounting of any camera with easy access for loading.

In pointing out the objects of the present invention the subject matter discussed is limited to adaptation of the present invention to a head for a camera tripod; however the basic structure of my device is also adaptable for use on a surveyor, telescope or any other device that it is desired to mount for movement whereby it can be directed along a changing line of sight.

These and other objects and advantages of my present invention will be more readily understood from following specifications and drawings of one specific embodiment of the present invention, in which:

Fig. 1 is a plan view of a head adapted for panoramic movement embodying the present invention;

Fig. 2 is a partially broken away back elevation thereof;

Fig. 3 is a side elevation thereof;

Fig. 4 is a partially broken away back elevation thereof with the members arranged in a different relationship;

Fig. 5 is a sectional view taken along line 5—5 in Fig. 4;

Fig. 6 is a plan view showing movement around the vertical axis.

Fig. 7 is a sectional view taken along line 7—7 of Fig. 2;

Fig. 10 is a sectional view taken along line 10—10 on Fig. 2;

Fig. 11 is a sectional view taken along line 11—11 on Fig. 1; and

Fig. 12 is a front view of the arm receiving member.

Figure 8:
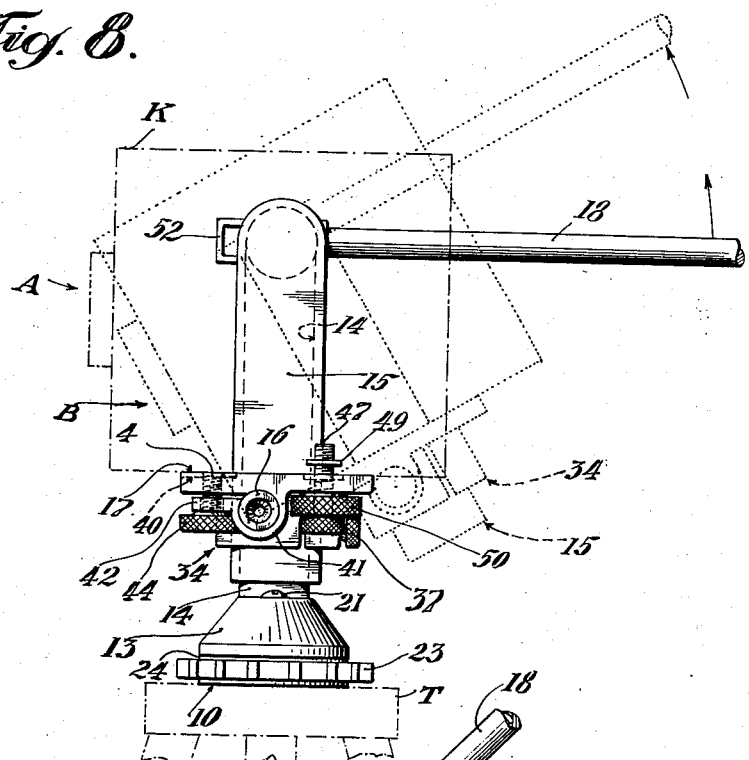
Fig. 8 is a side elevation showing movement around the horizontal axis.

A head embodying the instant invention may be secured to any tripod T. For this purpose the base 10 has a threaded hole 11 adapted to receive the standard size screw 12 located on the top of the tripod T. The supporting arm 13 is mounted for rotation about a vertical axis on the base 10 and supports the post 14 which in turn supports the camera yoke. The camera yoke consists of two members, a vertical yoke member 15 mounted on the post 14 for rotation about a horizontal axis, and a horizontal yoke member 16 mounted for relative movement vertically with respect to the vertical yoke member 15. The horizontal yoke member 16 carries the camera mounting plate 17 onto which the camera K is mounted. A pan and tilt arm 18 is provided for the operator by means of which he can direct the camera.

As seen in Fig. 2 the supporting arm 13 is pivotally mounted to the base 10 with ball bearings 19 and 20. Of course any other type of antifriction means can be used. This allows the supporting arm 13 to rotate very easily and very smoothly. Screw 21 holds the supporting arm 13 to the base 10 and ball bearing 20 prevents any great amount of torque that would tend to loosen the screw 21 from being transmitted to this screw as the supporting arm 13 is rotated. The set screw 22 is set up tightly against the screw 21 to aid in keeping it from loosening. The set screw 22 being set in so that it presses against the screw 21.

A locking ring 23 is threaded on to the base 10 so that clockwise rotation of the locking ring 23 will move it upwards pressing the friction washer 24 against the lower surface of the supporting arm 13 and will firmly hold supporting arm 13 against rotation about the base 10. Pins 24b are provided to prevent rotation of the locking ring 24 relative to the base 10. The outer end of the supporting arm 13 has a bore 25 through which fits the bolt 26, which is threaded into the tapped hole 27 in the bottom of the post 14. Surrounding the bore 25 on both sides of the supporting arm 13 are depressions 28 on the top and 29 on the bottom in which the pin 30, which is secured to the bottom of the post 14, fits. As can be appreciated from the drawing, the pin 30 will fit into any of the depressions 28 or 29 depending on just what position the operator desires the yoke to occupy. Of course if the post 14 is placed beneath the supporting arm 13 with the pin 30 in one of the depressions 29, the bolt 26 will be reversed and the knurled head of the bolt 26 will be located on the upper side of the supporting arm 13.

The vertical yoke member 15 has a horizontal cylindrical extension 15a surrounded by a cylindrical bearing 32 which fits into a bore 33 in the top of the post 14. The yoke is thus free to rotate in bearing 32 relative to the post 14 about a horizontal axis. The horizontal yoke member 16 is adjustably secured to the vertical yoke member 15 by means of clamp 34. One jaw 35 of the clamp 34 is integral with or rigidly secured to horizontal yoke member. The other jaw 36 is supported only by bolt 37 which fits through opening 38 in jaw 36 and is threaded into tapped hole 39 in the jaw 35. As can be seen best in Fig. 1 the sides 40 of the vertical yoke member 15 are slanted inwardly to present a good gripping and aligning surface for the clamp 34.

The camera mounting plate 17, as can be best seen in Fig. 3, is secured to the horizontal yoke member by means of arm 41. The arm 41 is adapted to fit around the horizontal yoke member 16 and terminates in ear 42 which has an opening 43 through which extends the bolt 44 which is threaded into tapped hole 45 in the bottom of the camera mounting plate 17. The camera mounting plate 17 is slightly wedge shaped, as seen best in Figs. 1 and 2, so that a quick change plate on to which the camera may be mounted, can be slipped on and held securely. A recess 46 is provided on the top of the camera mounting plate to form a seat for an eccentric lock. The camera attaching bolt 47 fits into unthreaded bore 48 in the table 17. A circular clip 49 fits around the bolt 47 and prevents the bolt from slipping through the plate 17 when no camera is mounted thereon. When a camera is mounted on the mounting plate 17 the bolt 47 is threaded into the mounting socket in the camera. A nut 50 is threaded on the bolt 47 and is used to draw the camera down against the mounting plate 17 and to hold it firmly in the desired position. A recess 51 is provided in the plate 17 to receive the clip 49 so that the clip will not interfere with the secure fit of the camera K against the plate 17.

As can be best seen in Figs. 10, 11 and 12 the operating arm 18 is mounted in arm receiving member 52. Seated within the horizontal cylindrical portion 15a and extending through the member 52 is the sleeve 53. The sleeve 53 has a threaded portion which extends beyond the member 52 and onto which is screwed the nut 54. The member 52 has teeth 55 which engage the teeth 56 on the end of the horizontal extension 15a of the vertical yoke member 15. In any of the operative positions the teeth 55 on the member 52 engage the teeth 56 on the extension 15a. Thus by movement of the arm 18 the vertical yoke member 15 may be rotated about a horizontal axis that is the centerline of the bearing 32 in the top of post 14. The cylindrical bearing 32 is provided to insure an easy and smooth rotation of the vertical yoke member 15.

By unscrewing the nut 54, thus moving it to the right as shown in Fig. 11, the member 52 may be slid to the right on the sleeve 53, thus, disengaging the teeth 55 and 56. In this position the arm 18 may be rotated freely on sleeve 53 and the arm 18 placed in any angular position relative to the vertical yoke member 15 as may be desired by the operator.

The end of the arm 18 that fits into the member 52 and through sleeve 53 is relieved on one side in the form of an elliptically curved surface 57. Positioned between the member 52 and the upper end of post 14 is a friction washer 31. The arm 18 within the member 52, passes through two circular openings 58 in the sleeve 53. These openings are cut to the same radius as the arm 18 and thus if the arm 18 is rotated about its longitudinal axis the axis of rotation will be the center line X—X of the arm 18. The sleeve 53 is held in position by flange 59 and nut 54. If the arm 18 is rotated about the axis X—X in Fig. 10, the surface 57 will jam up against the washer 31 which in turn will jam against post 14 around the sides of the bore 33, thus preventing the vertical yoke member 15 from rotating relative to the post 14. A curved shoulder 60 is located within the member 52 and fits into notch 61 in arm 18 to hold the arm within the member 52 so that it may not be pulled out.

As seen best in Fig. 3 and Fig. 10 the arm 18 has a long bore 62 extending its entire length. Slidably fitted within the bore 62 is a rod 63. The handle 64 is secured to the arm 18 and the rod 63 extends through the handle and terminates in the button 65. A spring 66 is positioned between the button 65 and the end of the arm 18. The member 52 has an opening 67 adapted to receive the end of a cable release for a camera. The operator, by pressing the button 65, can move the rod 63 against the action of the spring 66, forcing the other end of rod 63 against the cable release and the camera.

As can be seen in Fig. 6 the camera may be rotated 360° about the vertical axis, and as seen in Fig. 8 the camera can be rotated 360° about the horizontal axis so long as it will not hit the arm 13. When the yoke is in the position shown in Fig. 4, rotation of 360° about the horizontal axis is always possible.

Figure 9:
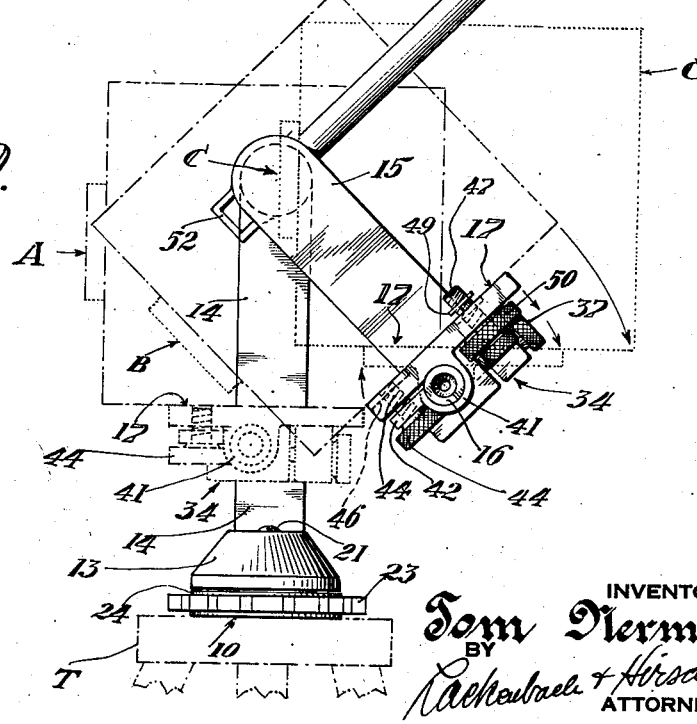
Fig. 9 is a side elevation thereof showing movement of the camera mounting plate.

Fig. 9 illustrates how the camera may be mounted in the position where its lens is located on the intersection of both axes of rotation starting with the camera in the position "A" of Fig. 9, by grasping the handle 64 on the arm 18, the camera may be swung into the position B. The handle can then be twisted axially locking the surface 57 against the washer 31. The operator can then loosen the bolt 44 and rotate the plate 17 into the position C. At the same time the plate 17 may be slid along horizontal yoke member 16 so that the lens is positioned at the point of intersection of the two axes. If the lens is lower on the camera it may be necessary to loosen the clamp 34 and position arm 16 and the plate 17 higher up on the vertical yoke member 15. When the camera is properly positioned the operator, by loosening the nut 54 and disengaging teeth 55 and 56, can move the handle 64 on arm 18 to the position best suited for him. By following the same procedure the camera can be mounted in a position where its center of gravity is located in line with the horizontal axis of rotation, thus eliminating any torque that would be caused by the camera from being transmitted to the operating handle 18.

As seen in Fig. 4, by unscrewing the bolt 26 the post 14 may be lifted up and the post swung around setting the horizontal yoke member 16 at any angle with the supporting arm 13 limited only by the number of depressions 28, and an unlimited number of positions are possible by removal of pin 30. Or the pin 30 may be placed in one of the depressions 29 with the post 14 extending downwardly from the supporting arm 13.

I claim:

1. A head comprising a base, a supporting arm mounted on the base for rotation in a horizontal plane relative to said base, a post secured to said arm, a yoke member mounted on said post for rotation in a vertical plane relative to the post, said yoke member comprising a vertical portion and a horizontal portion, and means for adjustably positioning said horizontal portion axially along said vertical portion, means for manually rotating said supporting arm and said yoke member, and means for attaching an instrument desired to be directed along a line of sight to said yoke member.

2. A head comprising a base, a supporting arm mounted on the base for rotation in a horizontal plane relative to said base, a post detachably secured to said arm, a yoke member mounted on said post for rotation in a vertical plane relative to the post, means for manually rotating said supporting arm and said yoke member, a second yoke member secured to the first mentioned yoke member and adapted to be moved axially along said first mentioned yoke member.

3. A head as claimed in claim 2 including a camera mounting plate, means for mounting said mounting plate on said second yoke member, and means for adjustably positioning said camera mounting plate along the longitudinal axis of said second yoke member and for adjustably positioning it angularly about the longitudinal axis of said second yoke member.

4. A head having a mounting plate, means for rotating said mounting plate about a horizontal axis, means for rotating said mounting plate about a vertical axis and means for tilting said mounting plate so that a camera carried on said mounting plate may be positioned with a specific point of said camera located at the intersection of the horizontal axis and vertical axis of rotation.

5. A head as claimed in claim 1 including means for locking the arm against rotation relative to the base.

6. A head as claimed in claim 1 including means for locking the vertical yoke member against rotation relative to the post.

7. A head as claimed in claim 1 wherein said means for manually rotating said supporting arm and said yoke member comprises a directing arm detachably secured to said yoke member whereby it may be rotated independently relative to said yoke member about a horizontal axis.

8. A head as claimed in claim 2 in which said means for manually rotating said supporting arm and said yoke member comprises a directing arm secured to said yoke member and a cam surface on said directing arm, a slidable member engaging said cam surface and said yoke member whereby rotation of said directing arm about its longitudinal axis causes said cam surface to urge said slidable member to slide in a horizontal direction, causing said yoke to frictionally engage said post, locking the vertical yoke member against rotation relative to said post.

9. A head as claimed in claim 1 wherein said means for manually rotating said supporting arm and said yoke member comprises a directing arm, means to secure the end of a camera release cable to one end of said directing arm, a rod slidably mounted within said arm, one end of said rod engaging the activating button of said camera release cable, and the other end of said rod projecting from said arm and a spring urging said rod away from the first-mentioned end of said arm.

10. A head as claimed in claim 1 in which the post may be mounted in a plurality of positions as rotated about its vertical axis.

11. A head as claimed in claim 1 in which the post may be mounted perpendicular to the supporting arm either extending upwardly or downwardly from said supporting arm.

12. A head as claimed in claim 1 wherein said yoke member can be rotated 360° in the vertical plane.

TOM NERMAN.

References Cited in the file of this patent

UNITED STATES PATENTS

| Number | Name | Date |
| --- | --- | --- |
| 2,237,281 | Diesbach | Apr. 1, 1941 |
| 2,423,282 | Aubey | July 1, 1947 |